Aug. 2, 1927.

A. KOTTMANN 1,637,827

COUPLING DEVICE FOR CALCULATING MACHINES

Filed Dec. 24, 1925

Inventor:
August Kottmann
by Loora, Kellenbeck & Farley
Attorneys

Patented Aug. 2, 1927.

1,637,827

UNITED STATES PATENT OFFICE.

AUGUST KOTTMANN, OF SOMMERDA, GERMANY, ASSIGNOR TO RHEINISCHE METALL-WAAREN- UND MASCHINENFABRIK, OF DUSSELDORF-DERENDORF, GERMANY.

COUPLING DEVICE FOR CALCULATING MACHINES.

Application filed December 24, 1925, Serial No. 77,654, and in Germany October 10, 1925.

The invention relates to coupling devices for the counting mechanism of calculating machines fitted with reversing gear which is out of engagement when the main crank is in the zero position, and is substantially characterized in that the reversing gear is adapted to be brought into engagement, in one or the other direction of rotation, according to the position of the counting mechanism at the moment, by means of two levers, operated by the crank in opposite directions, as soon as the crank is moved out of its zero position.

Figure 1:
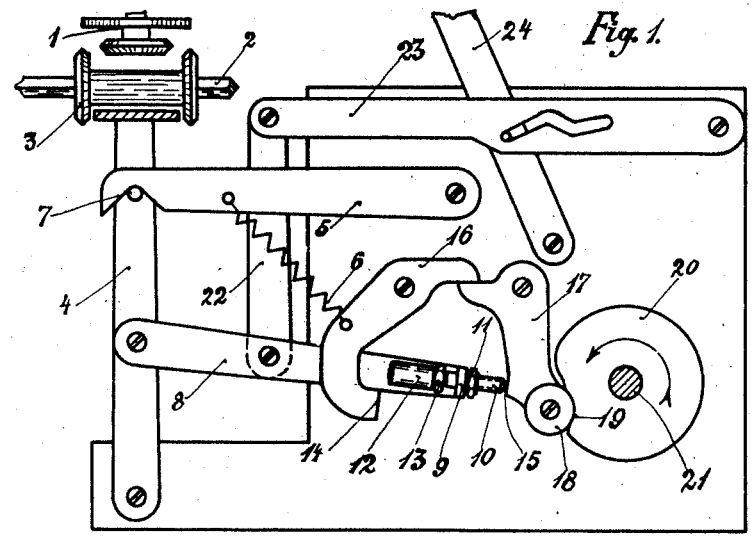
Figure 2:
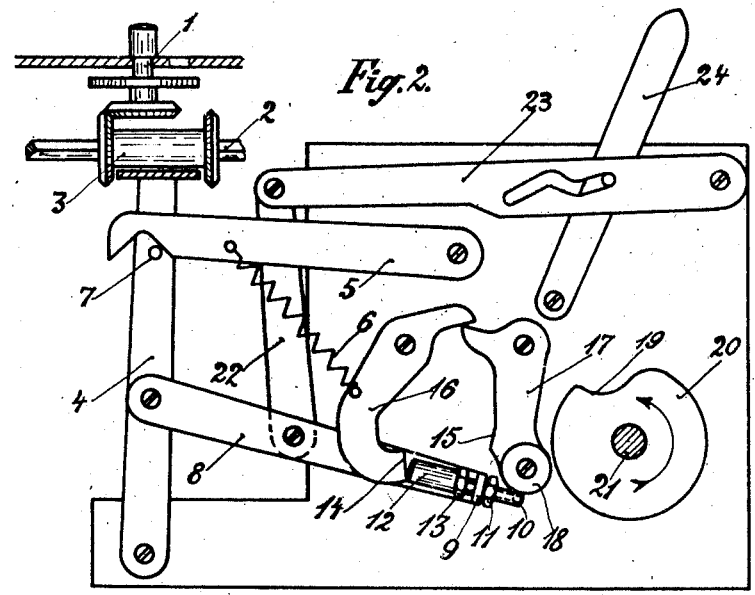
Figure 3:
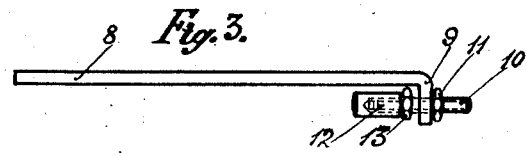

An embodiment of the invention is illustrated in the accompanying drawing, in which:

Fig. 1 is an elevation of the device according to the invention, in the zero position, Fig. 2 being a similar elevation to Fig. 1, in the engaged position, and Fig. 3 an elevation of the draw and thrust bars, with the adjustable stops.

The reversing gear 3, which is adapted to be displaced by the coupling arm 4, is mounted on a square shaft 2 under the counting mechanism 1 of the calculating machine. The arm 4 is provided with a pin 7 coacting with a notch on the free end of a lever 5, which is adapted to hold the gear in middle position, and is controlled by a spring 6 for the purpose of retaining the reversing gear in midway or inoperative position, as shown in Fig. 1. To the arm 4 is articulated a rod 8, the bent end 9 of which carries a threaded member 10, having a counter-nut 11 and cap nut 12 with corresponding counter nut 13. The member 10 lies between the striker ends 14 and 15 of two pivoted levers 16 and 17 having a tongs-like action. The spring 6 connected to the centering lever 5 is attached at its other end to the long arm of one of the levers 16, the short arm of which is in permanent contact with the short arm of the other lever 17. On the long arm of the latter is a roller 18, which is kept pressed, by the action of the spring 6, against a cam 20 on the crank shaft 21, said cam having a recess 19. When, as shown in Fig. 1, the roller 18 lies in the recess 19 of the cam 20 the crank shaft 21 is in its neutral position and the reversing gear is in its mid position, and out of engagement with the counting mechanism 1. When, on the other hand, the roller 18 is moved out of the recess 19 by the rotation of the cam 20, it exerts on the lever 17 a pressure which is transmitted to the lever 16 by means of the coacting short arms of the levers 16 and 17. The rod 8 is connected through an intermediate lever 22, with a slotted lever 23 which, in turn, is connected with the coupling lever 24. The roller 18 being pressed against the cam 20 by the action of the spring 6 and having entered the recess 19 said spring serves, in addition to its other functions, to retain the crank shaft 21 in its neutral position.

When the adjustment of the coupling lever 24 has brought the stop 14 on the lever 16 opposite the cap 12, and the crank shaft 21 and therefore the cam 20 is turned so that (as shown in Fig. 2) the roller 18 leaves the recess 19, then the aforesaid pivotal movement of the levers 17, 16. draws back the rod 8, owing to the contact of the end 14 of the lever 16 against the cap 12, so that the bevel wheel on the left of the reversing gear 3 (Figs. 1 and 2) engages the bevel wheel of the counting mechanism 1. If, on the other hand, the coupling lever 24 is in the opposite position, as shown in Fig. 1, the stop 15 on the lever 17 bears against the end of the member 10, so that, if the crank shaft 21 and cam 20 be now rotated, the rod 8 will be pushed forward, and the right hand bevel wheel (Figs. 1 and 2) of the reversing gear 3 will engage the bevel wheel of the counting mechanism 1.

What I claim is:—

1. A coupling device for calculating machines having a reversing gear which is out of engagement when the main shaft is in its neutral position, comprising in combination a cam mounted on said shaft. levers adapted to be moved by said cam, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine.

2. A coupling device for calculating machines having a reversing gear which is out of engagement when the main shaft is in its neutral position, comprising in combination, a cam mounted on said shaft, levers adapted to be moved by said cam, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine and an adjustable stop on one of the levers of the said lever mechanism adapted to contact with the said levers operated by said cam.

3. A coupling device for calculating machines having a reversing gear which is out of engagement when the main shaft is in its neutral position comprising in combination, a cam mounted on said shaft, levers adapted to be moved by said cam, said levers comprising one lever continually in contact with said cam and a second lever adapted to engage continually with a tooth or projection on the said cam contacting lever, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine.

4. A coupling device for calculating machines having a reversing gear which is out of engagement when the main shaft is in its neutral position comprising in combination, a cam mounted on said shaft, levers adapted to be moved by said cam, said levers comprising one lever continually in contact with said cam and a second lever adapted to engage continually with a tooth or projection on the said cam contacting lever, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine and an adjustable stop on one of the levers of the said lever mechanism adapted to contact with the said levers operated by said cam.

5. A coupling device for calculating machines having a reversing gear which is out of engagement when the main shaft is in its neutral position comprising in combination a cam mounted on said shaft, levers adapted to be moved by said cam, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine and common spring means for returning said levers and moving said reversing gear into inoperative position when the shaft returns to its neutral position, said common spring means adapted also to retain the said shaft in its neutral position.

6. A coupling device for calculating machines having a reversing gear which is out of engagement when the main shaft is in its neutral position comprising in combination, a cam mounted on said shaft, levers adapted to be moved by said cam, said levers comprising one lever continually in contact with said cam and a second lever adapted to engage continually with a tooth or projection on the said cam contacting lever, a lever mechanism operated by said levers when the said shaft rotates out of its neutral position for moving the reversing gear into one of its operative positions, the direction of such movement being dependent upon the setting (for addition or subtraction) of the counting mechanism of the said calculating machine and an adjustable stop on one of the levers of the said lever mechanism adapted to contact with the said levers operated by said cam and common spring means for returning said levers and moving said reversing gear into inoperative position when the shaft returns to its neutral position, said common spring means adapted also to retain the said shaft in its neutral position.

7. A coupling device for calculating machines having a reversing gear which is out of engagement when the main shaft is in its neutral position, comprising a cam, a pair of pivoted levers having striker ends movable toward and away from each other by the action of said cam, shifting means for moving the reversing gear into its operative positions, and adjusting means for selectively adjusting said shifting means into operative relation with the striker end of one or the other of said levers whereby the direction of movement of said reversing gear is controlled.

In testimony whereof I have affixed my signature.

AUGUST KOTTMANN.